United States Patent
Hwang et al.

(10) Patent No.: US 9,137,359 B2
(45) Date of Patent: Sep. 15, 2015

(54) TERMINAL AND METHOD FOR MANAGING CALL FUNCTION

(71) Applicant: Samsung Electronics Co., Ltd., Gyeonggi-do (KR)

(72) Inventors: Sunmin Hwang, Gyeonggi-do (KR); Jaewan Cho, Gyeonggi-do (KR); Soonhyun Cha, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 73 days.

(21) Appl. No.: 13/839,364

(22) Filed: Mar. 15, 2013

(65) Prior Publication Data

US 2014/0079194 A1  Mar. 20, 2014

(30) Foreign Application Priority Data

Sep. 14, 2012 (KR) .......................... 10-2012-0101893

(51) Int. Cl.
  *H04M 1/64* (2006.01)
  *H04M 3/42* (2006.01)
  *H04M 1/27* (2006.01)
  *H04M 1/82* (2006.01)

(52) U.S. Cl.
  CPC ................ *H04M 3/42* (2013.01); *H04M 1/271* (2013.01); *H04M 1/82* (2013.01); *H04M 2250/12* (2013.01); *H04M 2250/22* (2013.01); *H04M 2250/60* (2013.01)

(58) Field of Classification Search
  CPC .......................... H04M 1/645; H04M 3/53383
  USPC ......... 379/88.01, 88.22, 88.13; 455/563, 436, 455/564; 250/201.1
  See application file for complete search history.

(56) References Cited

U.S. PATENT DOCUMENTS

| | | | |
|---|---|---|---|
| 4,945,570 A * | 7/1990 | Gerson et al. ................ | 455/563 |
| 6,222,909 B1 * | 4/2001 | Qua et al. ................... | 379/88.22 |
| 2002/0090947 A1 * | 7/2002 | Brooks et al. ................ | 455/436 |
| 2005/0202849 A1 * | 9/2005 | Ignatin ........................ | 455/564 |
| 2008/0006762 A1 * | 1/2008 | Fadell et al. ................. | 250/201.1 |
| 2011/0268260 A1 * | 11/2011 | Madhavapeddi et al. .. | 379/88.13 |

* cited by examiner

*Primary Examiner* — Fan Tsang
*Assistant Examiner* — Van D Huynh (57) ABSTRACT

Provided are a terminal and a method for managing a call function of a terminal, including a call termination and call retransmission function based on a state of a terminal using a voice recognition or a sensor. The method for managing a call function of a terminal includes sequentially acquiring at least one input voice during a phone call, extracting a finally acquired voice from the at least one voice when call termination is requested, and storing information about the finally acquired voice in a database under a call termination command.

19 Claims, 10 Drawing Sheets

| 1 | 2 | 3 | ... | n |
|---|---|---|---|---|
| Voice 2 | Voice 3 | Voice 4 | ... | Voice n+1 |

TERMINAL AND METHOD FOR MANAGING CALL FUNCTION

CROSS-REFERENCE TO RELATED APPLICATION(S) AND CLAIM OF PRIORITY

The present application is related to and claims the benefit under 35 U.S.C. §119(a) of a Korean patent application No. 10-2012-0101893 filed on Sep. 14, 2012 in the Korean Intellectual Property, the entire disclosure of which is hereby incorporated by reference.

TECHNICAL FIELD

The present invention relates to a terminal and a method for managing a call function in a terminal, and more particularly, conducting a call termination and call retransmission function based on the status of a terminal and by recognizing voice.

BACKGROUND

A demand for convenient and simple management of a call function at a terminal in a view of a user has been increased. As various sensors are mounted in the terminal to satisfy the user demand, a method for managing a call transmission using a sensor has actively studied and developed.

However, only when a user touches a termination button of the terminal, a call is comes to be disconnected. When the user or the other party forgets to input the termination button for some reasons, unnecessary call continues after the end of phone conversation.

When a phone involuntarily stops during a call, because a current terminal enters an idle screen mode or a lock screen mode, the user has to unlock and execute a call application to retransmit a call, for example, through a latest call list. Accordingly, there is a need in the art for an terminal and method for convenient and simple management of a call function at a terminal.

SUMMARY

To address the above-discussed deficiencies of the prior art, it is a primary object to provide a method for managing a call function in a terminal which performs a call termination function or a call retransmission function based on a detected state of the terminal using a voice of a user and a sensor, and a terminal thereof.

In accordance with an aspect of the present disclosure, a method for managing a call function of a terminal, includes sequentially acquiring at least part of input voice during a phone call, extracting a finally acquired voice from the at least one voice when call termination is requested and storing information about the finally acquired voice in a database under a call termination command. The sequentially acquiring of the at least part of input voice includes temporarily storing the at least one voice in a buffer with predetermined capacity. The storing of the information includes converting the finally acquired voice into a text, and storing the converted text in the database under the call termination command. The storing of the information includes extracting a voice pattern from the finally acquired voice, identifying a user based on the extracted voice pattern, and storing the information about the finally acquired voice in the database corresponding to the identified user.

In accordance with an aspect of the present disclosure, a method of controlling a call function of a terminal, further includes performing the call when the call is requested, determining whether a voice inputted while performing the call corresponds to the call termination command, and terminating the call when the voice inputted while performing the call corresponds to the call termination command or the voice has not inputted for a preset time. Determining whether a voice corresponding to the call termination command is inputted includes searching information corresponding to the voice inputted while performing the call from the database, and determining that the voice corresponding to call termination command is inputted when the corresponding information is included in the database.

The terminating of the call includes determining whether the preset time elapses after the voice corresponding to the call termination command was inputted, determining whether a call termination event occurs when the preset time does not elapse and terminating the call when the call termination event occurs. The call termination event includes at least one detection of specific illumination, specific motion, and touch or approach of an object.

In accordance with an aspect of the present disclosure, a method of controlling a call function of a terminal, further includes determining whether the preset time elapses after terminating the call, determining whether a call retransmission event occurs whether the preset time does not elapse and performing call retransmission based on a latest call number when the call retransmission event occurs. The call retransmission event includes a voice input event which a voice having a same voice pattern as that of a voice input during the phone call. The call retransmission event includes at least one detection of specific illumination, specific motion, and touch or approach of an object.

In accordance with another aspect of the present disclosure, a terminal includes a voice input unit receiving a voice, a memory configured to store a database including at least one call termination command and a controller configured to sequentially acquire at least one voice through the voice input unit during a phone call, extract a finally acquired voice from the at least one voice when call termination is requested, and control the memory to store information about the finally acquired voice in the database as the call termination command. The controller is configured to convert the finally acquired voice into a text and controls the memory to store the converted text in the database under the call termination command. The controller makes the call when the call is requested, determines whether a voice inputted through the voice input unit corresponds to data under the call termination command during the phone call, and terminates the call when the input voice corresponds to the call termination command, or the voice has not inputted for a preset time.

In accordance with another aspect of the present disclosure, a terminal further includes a sensor configured to detect a state of the terminal, including illumination, motion, and presence of touch or approach of an object, wherein the controller is configured to determine whether a preset time elapses after a voice corresponding to the call termination command was inputted, determining whether a call termination event occurs through the sensor when the preset time does not elapse, and terminate the call when the call termination event occurs.

In accordance with still another aspect of the present disclosure, a method of controlling a call function of a terminal, includes monitoring for voice intending to terminate the call, determining whether a preset time elapses after terminating the call, determining whether a call retransmission event occurs when the preset time does not elapse, and performing call retransmission based on a latest call number when the call retransmission event occurs. The determining whether the call retransmission event occurs includes extracting a voice pattern from the input voice when the voice is inputted, determining whether the voice pattern is identical with a voice pattern extracted from a voice inputted during the call, and determining that the call retransmission event occurs when the voice pattern is identical with the extracted voice pattern. The call retransmission event includes at least one detection of specific illumination, specific motion, and touch or approach of an object. The performing of the call retransmission includes outputting a call retransmission alarm including at least one of a pop-up window, an indicator, an icon, vibration, and a sound.

In accordance with yet another aspect of the present disclosure, a terminal includes a voice input unit configured to acquire a voice, a sensor configured to detect a state of the terminal including illumination, motion, and presence of touch or approach of an object, a memory configured to store a latest call number; and a controller configured to terminate the call, determine whether a preset time elapses after detecting a voice intending to terminate the call, and perform a call retransmission based on the latest call number when a call retransmission event occurs through one of the voice input unit and the sensor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication device. Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The present disclosure directs to the controlling a terminal using a call function. The present disclosure can be applied to a general electronic terminal such as a smart phone, a portable terminal, a mobile terminal, a Personal Digital Assistant (PDA), a Portable Multimedia Player (PMP) terminal, a note pad, a Wibro terminal, a tablet PC and various devices providing a call function.

Figure 1:
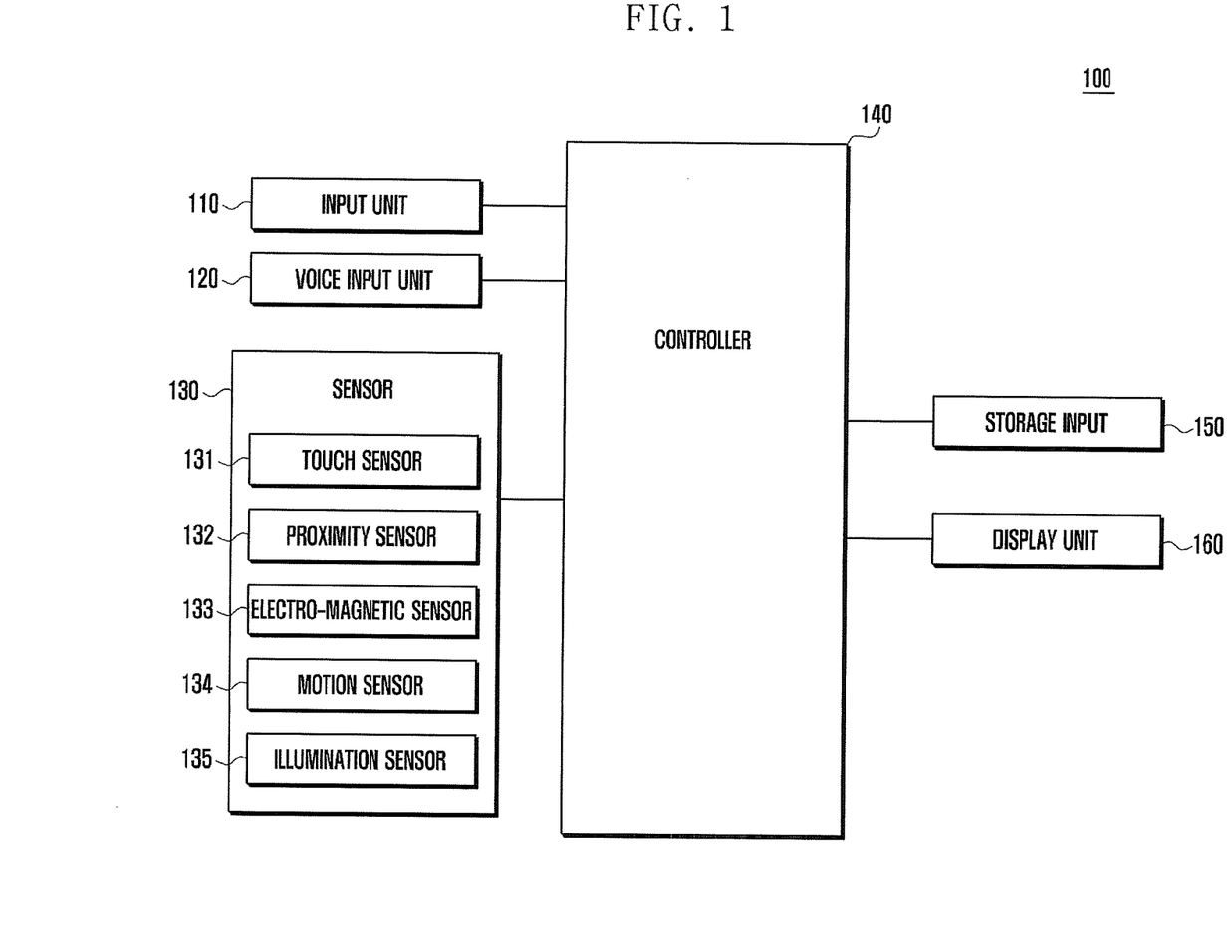
FIG. 1 is a high-level block diagram of a terminal according to an exemplary embodiment of the present disclosure.

FIG. 1 is a block diagram illustrating a configuration of a terminal according to an exemplary embodiment of the present disclosure. Referring to FIG. 1, the terminal 100 may include an input unit 110, a voice input unit 120, a sensor 130, a controller 140, a memory 150, and a display unit 160.

The input unit 110 receives input data from a user so that a user can control an operation of the terminal 100. The input unit 110 can employ a key pad dome switch, a touch pad (constant pressure/capacitive), a jog wheel and/or a jog switch.

In one embodiment according to the present disclosure, the input unit 110 receives a call request input, a call termination request, and a call retransmission request input.

The voice input unit 120 receives an external sound signal by a microphone in a call mode, a recording mode, and a voice recognition mode to process it as electric sound data. The processed voice data may be transmitted to a base station in a call mode. The voice input unit 120 may be implemented by various noise removal algorithms for removing a noise generated during a procedure of receiving an external sound signal.

In one embodiment according to the present disclosure, the voice input unit 120 receives a voice for a preset time during a call or after termination of the call.

The sensor 130 can include a touch sensor 131, a proximity sensor 132, an electro-magnetic sensor 133, a motion sensor 134 and an illumination sensor 135.

The touch sensor 131 detects a touch input of a user. The touch sensor 131 includes a touch film, a touch sheet, a touch pad or a Touch Screen Panel (TSP) coupled with the display unit 160. The touch sensor 131 detects a touch input and transfers a detected touch input to the controller 140. The controller 140 can analyze a touch signal to perform an operation corresponding to the touch input. Information corresponding to the detected touch input can be displayed on the display unit 160. The touch sensor 131 receives an operation signal according to touch input of the user by various input means. The touch sensor 131 can receive an operation signal according to a body (e.g., hand) of the user, a physical tool, a stylus pen, and an operation button which can be included in the stylus pen. The touch sensor 131 can detect direct touch and proximity input within a predetermined distance.

The proximity sensor 132 detects presence of an object approaching the terminal, an object existing around the terminal 100 using an electronic force or infrared ray without a mechanical contact. For example, the proximity sensor 132 can include a transmission photoelectric sensor, a direct reflection photoelectric sensor, a mirror reflection photoelectric sensor, a high frequency oscillating proximity sensor, a capacitive proximity sensor, a magnetic proximity sensor and an infrared proximity sensor.

The electromagnetic sensor 133 detects a touch or proximity input by intensity change of an electromagnetic field. The electromagnetic sensor 133 can include a coil generating a magnetic field, and detect the approach of an object causing energy change of the magnetic field generated from the electromagnetic sensor 133. The electromagnetic sensor 133 can detect an object such as a stylus pen, including a resonance circuit. The electromagnetic sensor 133 can detect contact input, proximity input or hovering gesture input in the vicinity of the terminal 100.

The motion sensor 134 detects a location or a motion of the terminal using an acceleration sensor or a gyro sensor. The acceleration sensor detects acceleration variation due to a motion and converts the detected acceleration variation into an electric signal. The gyro sensor can measure angular velocity of the terminal 100 performing a rotational motion and detects rotated angle with respect to a reference direction. For example, the gyro sensor can detect rotating angle with respect to three direction axes, that is, pitch, roll, and yaw.

The illumination sensor 135 measures an amount of light around the terminal 100. Based on the amount of the light, the illumination sensor 135 detects a level of brightness around the terminal 100 and converts the brightness level into an electric signal.

In one embodiment according to the present disclosure, the sensors 130 detect states of the terminal 100, including illumination, motion, and presence of touch or approach of an object.

The controller 140 controls an overall operation of the terminal 100. For example, the controller 140 can control a call termination or retransmission function of the terminal 100.

In one embodiment according to the embodiment of the present disclosure, the controller 140 sequentially acquires and monitors voice through a voice input unit 120 during a call. If a speech for call termination is monitored, the controller 140 extracts a lastly acquired voice and stores information of the lastly acquired voice in the memory 150 as a call termination command.

In one embodiment according to the embodiment of the present disclosure, the controller 140 performs a call when the call is requested. The controller 140 determines whether a voice input through the voice input unit 120 corresponds to the call termination command while performing the call. If the input voice corresponds to the call termination command or the voice, the controller 140 terminates the call.

In one embodiment according to the embodiment of the present disclosure, the controller 140 terminates the call according to a user request or in a case of involuntary situation. After terminating the call, if a call retransmission event occurs through one of the voice input unit 120 and the sensor unit 130 within a preset time, the controller 140 performs call retransmission based on the last call number. for the examples of that the call is involuntarily terminated, a call signal is instable or signal strength becomes weak less than a threshold so that maintenance of the call is impossible. When the call is involuntarily terminated, the call can be terminated due to instable network or a problem on the terminal 100 because of call-off, limited signal, and no-service.

The controller 140 will be described below in detail with reference to the accompanying drawings.

The memory 150 stores programs or command for the terminal 100. The controller 140 performs the programs or the commands stored in the memory 150.

The memory 150 can include at least one suitable storage medium such as a flash memory type, a hard disk type, a multimedia card micro type, card type memory (e.g., SD or XD memory), a Random Access Memory (RAM), a Static Random Access Memory (SRAM), a Read-Only Memory (ROM), an Electrically Erasable Programmable Read-Only Memory (EEPROM), or a Programmable Read-Only Memory (PROM).

In one embodiment according to the present disclosure, the memory 150 temporarily or permanently store at least part of voice inputted during the phone call. The memory 150 stores a call termination command table including at least one call termination command. The memory 150 can store information on a pattern of a voice in the call termination command table.

In one embodiment according to the embodiment of the present disclosure, the memory 150 can store an algorithm or a voice photograph for converting a voice into a text.

The display unit 160 displays or outputs information processed by the terminal 100. For example, the display unit 160 displays User Interface (UI) or Graphic User Interface (GUI) associated with call control of the terminal 100.

The display unit 160 can include at least one of a liquid crystal display (LCD), a thin film transistor-liquid crystal display, (TFT LCD), an organic light-emitting diode (OLED), a flexible display, and a 3D display.

The display unit 160 can have a mutual layer structure and act as a touch screen. In this case, the display unit 160 acting as the touch screen can perform a function of the input unit 110.

In one embodiment according to the embodiment of the present disclosure, the display unit 160 displays UI or GUI including a dial key pad and a call time according to performing the call function.

Constituent elements shown in FIG. 1 are not essential and a terminal 100 having more or less constituent elements shown in FIG. 1 can be implemented.

Figure 2:
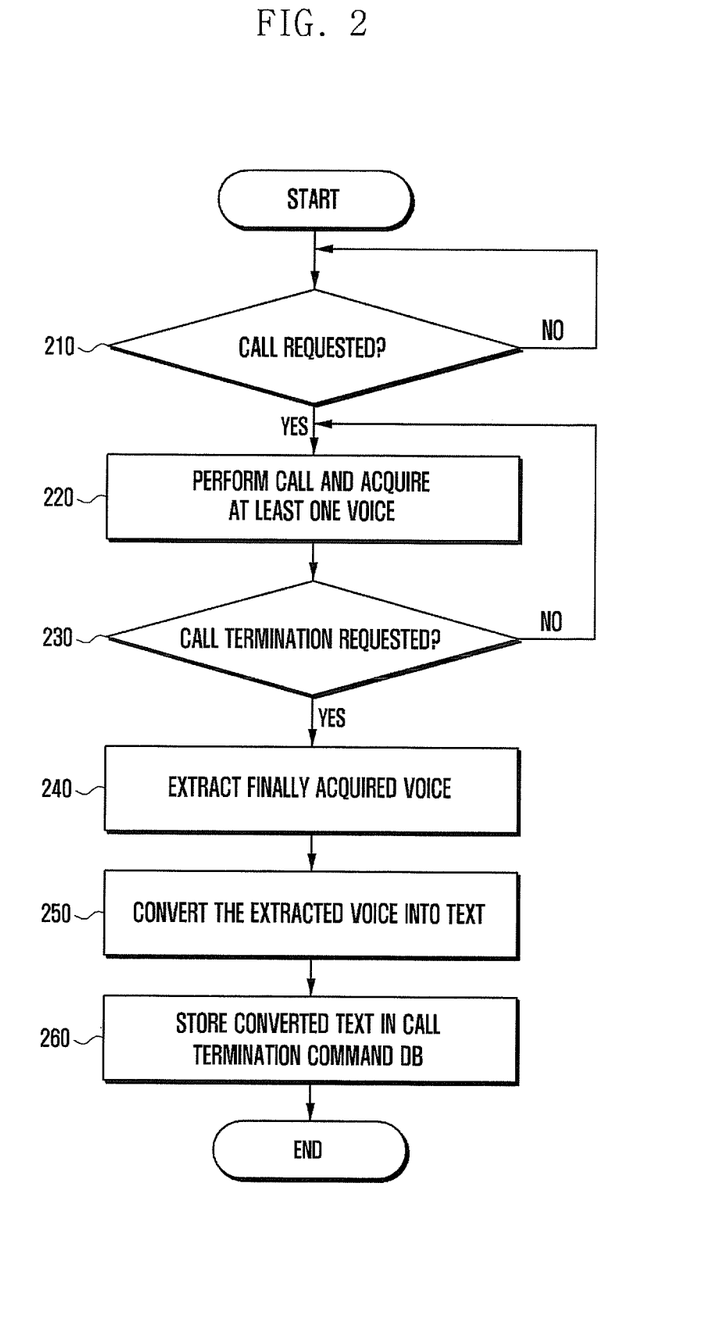
FIG. 2 is a flowchart illustrating a method for managing a call function of a terminal according to one embodiment of the present disclosure.

FIG. 2 is a flowchart illustrating a method of controlling a call function of a terminal according to one embodiment of the present disclosure. Referring to FIG. 2, a controller 140 determines whether a call is requested (210). The controller 140 determines whether the call is automatically requested according to a user input for driving an application, a program, and a service for the call according to the need. The request of a call can be generated from a user input or a reception of call request from a base station. The terminal 100 can receive information about a call receiver or a call transmitter together with the call request.

If the call is requested, the controller 140 performs the call and the voice input unit 120 monitors and acquires at least one part of voice (220).

The controller 140 makes a call by the call number corresponding to the call request, or receives an incoming phone call. In this case, the controller 140 can display UI or GUI associated with performing the call. For example, the controller 140 can control the display unit 160 to display a number of the incoming call, a call time or an image of the other party of the phone call.

The voice input unit 120 monitors and acquires at least one part of voice. The voice input unit 120 acquires and converts an analog signal generated from input voice into a digital signal, and encodes the digital signal to store it in the memory 150. In this case, a procedure of acquiring a voice by the voice input unit 120 can be the same as a procedure of acquiring a voice applied to voice recording, voice recognition or a recording function during the call. The voice input unit 120 can transfer a signal generated from the acquired voice to the controller 140.

The voice input unit 120 can sequentially acquire at least one part of voice. The controller 150 can sequentially acquire voices inputted from the voice input unit 120 and arrange and store the acquired voices in the memory 150.

In this case, the voice input unit 120 can sequentially acquire at least one voice based on a pause between voices inputted during the call. If a voice input is not detected for a preset time occurs after input of the voice, the voice input unit 120 can process the input voice and acquires the processed input voice as a first voice. If a new voice is inputted after the pause and a new pause occurs for a preset time after input of the voice, the voice input unit 120 can process the new voice and acquire the processed new voice as a second voice.

Figure 3A:
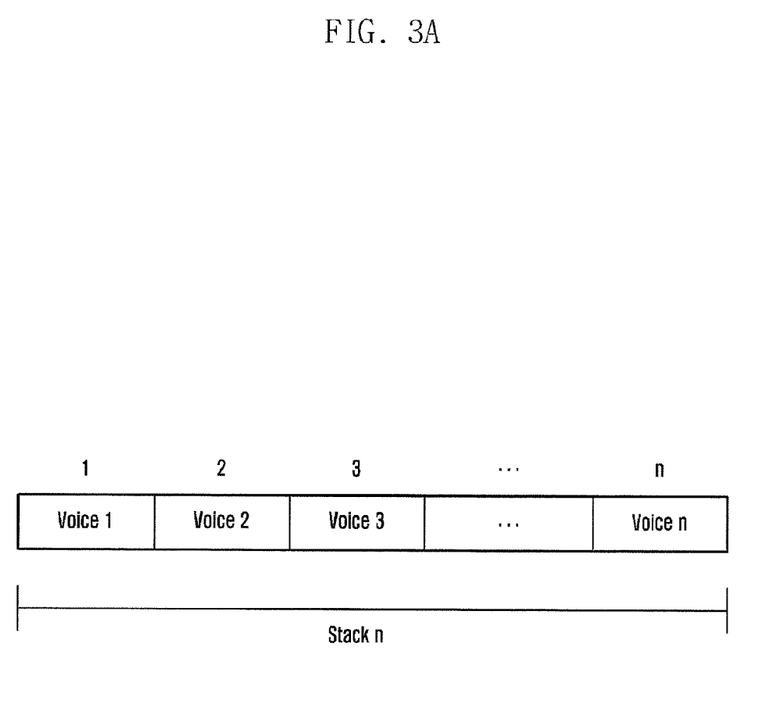
FIGS. 3a to 3c are diagrams illustrating examples of acquiring a voice according to one embodiment of the present disclosure.
Figure 3B:
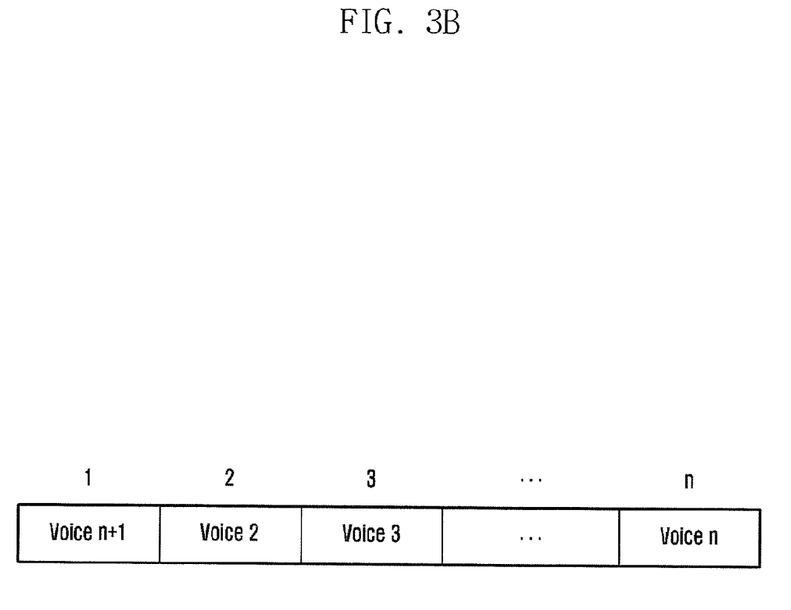
Figure 3C:
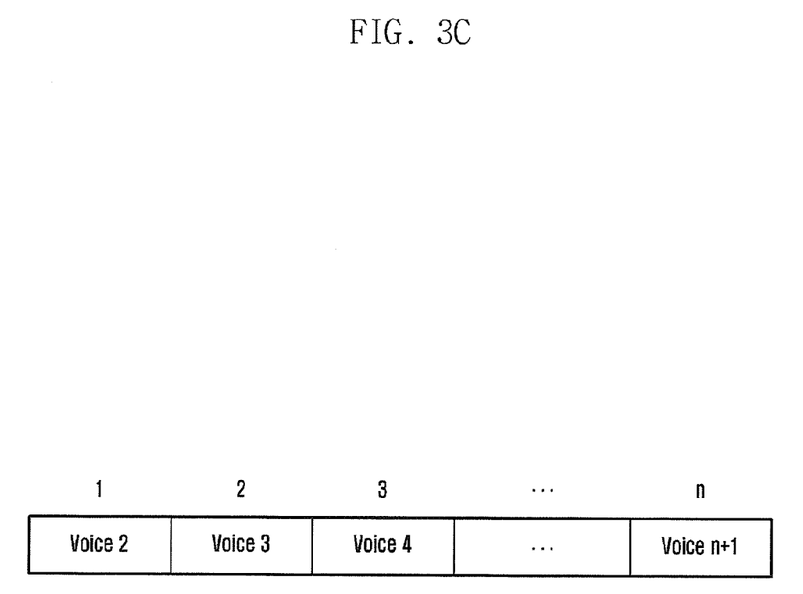

The controller 140 can temporarily or permanently store at least one voice in a buffer in the memory 150 having predetermined capacity. The buffer having the predetermined capacity can be configured by n stacks capable of n voices, where n is a positive integer. The n stack can have linear or circular stack, queue, and deque structure. The n stacks can have the same or different capacities according to data sizes of the voices. Referring to FIG. 3a, the terminal 100 can sequentially store input voices in the n stacks during the call, and store n voices according to the number of the stacks.

When a new voice inputted beyond the capacity of the buffer during the call, the controller 140 can delete a firstly acquired voice among the n voices and stored the newly inputted voice in the buffer. For example, referring to FIG. 3b, when the new voice is inputted beyond the capacity of the buffer, the controller 140 deletes the firstly acquired voice 1 and store the newly input voice in the stack 1 from which the voice 1 is deleted. In this case, the buffer can be implemented by a circular stack having n stacks. For instance, referring to FIG. 3c, when a new voice is inputted beyond the capacity of the buffer, the controller 140 deletes the firstly acquired voice 1, rearranges remaining n−1 voices from a stack 1 to stack an n−1, and store the newly input voice in a stack n. In this case, the buffer can be implemented by a queue having n stacks.

Next, the controller 140 determines whether call termination is requested (230).

The controller 140 determines whether the call termination is requested through menus, icons or buttons included in the terminal 100, switches, or jog dial for generating a call termination request from the input unit 110. When the call cannot maintain because a call receiving signal is instable or signal strength becomes weak, the controller 140 can determine that the call termination is requested.

If the call termination is requested, the controller 140 extracts a finally acquired voice (240).

The controller 140 extracts the finally acquired voice of at least part of voice sequentially acquired according to the request of the call termination.

After that, the controller 140 can convert the extracted voice into a text (250).

The controller 140 converts the finally acquired and extracted voice into a text. The controller 140 can include a program, an algorithm or a voice recognition dictionary for converting the voice into the text.

In detail, the controller 130 can extract a voice pattern from the extracted voice. The controller 140 can search for a text corresponding to the extracted voice pattern based on a voice recognition dictionary including at least one text for voice recognition. As a result of the search, if there is a text corresponding to the extracted voice pattern, the controller 140 can convert the extracted voice into a corresponding text. Alternatively, if there is no text corresponding to the extracted voice pattern, the controller 140 can output at least one of a text, an image, an icon, and a sound indicating a voice recognition error.

Next, the controller 140 stores the converted text in a database (DB) 260 under a call termination command.

The controller 140 stores a text converted corresponding to a finally acquired voice during the call in a DB under a call termination command. In this case, the controller 140 can simultaneously store a voice pattern extracted from the voice. The controller 140 can identify a user based on the voice pattern of the voice and generate and manage a call termination command table of the identified user. The controller 140 can extract a voice pattern of a finally acquired voice, identify a user based on the extracted voice pattern, and store the converted text in a call termination command DB corresponding to the identified user. In the operation, when a plurality of users use one terminal 100, the controller 140 can set different call termination commands to respective users.

Figure 4:
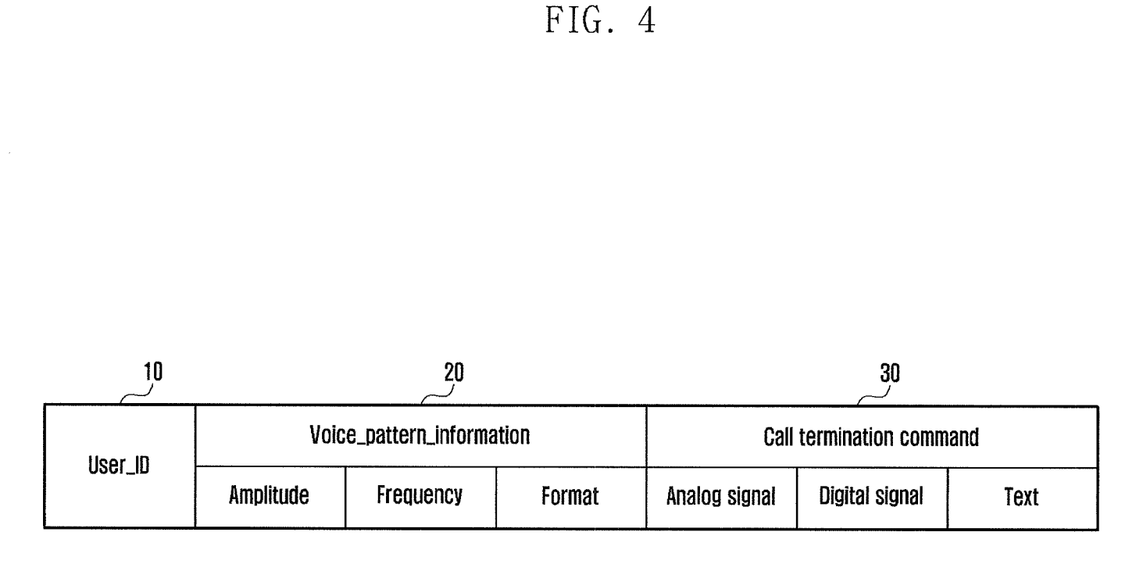
FIG. 4 is a diagram illustrating a call termination command table according to one embodiment of the present disclosure.

The call termination command DB can have a table form as illustrated in FIG. 4 to store commands of a user for terminating the call.

Referring to FIG. 4, the call termination command DB can a user ID 10 of a user of the terminal 100. The call termination command DB can store voice pattern information 20 including a unique characteristic per a user. For example, the voice pattern information 20 can include amplitude, frequency and format. The call termination command of the DB can include at least one call termination command 30. The call termination command 300 can include an analog signal of the acquired voice or a digital signal converted from the analog signal. The call termination command 30 can include a text converted from the acquired voice as the call termination command.

As illustrated above, in one embodiment according to the present disclosure, the controller 140 can detect frequently used speech when the user terminates the call and grasp intention of the user for terminating the call by configuring a call termination command DB based on a voice of the user inputted just before termination of the call.

Figure 5:
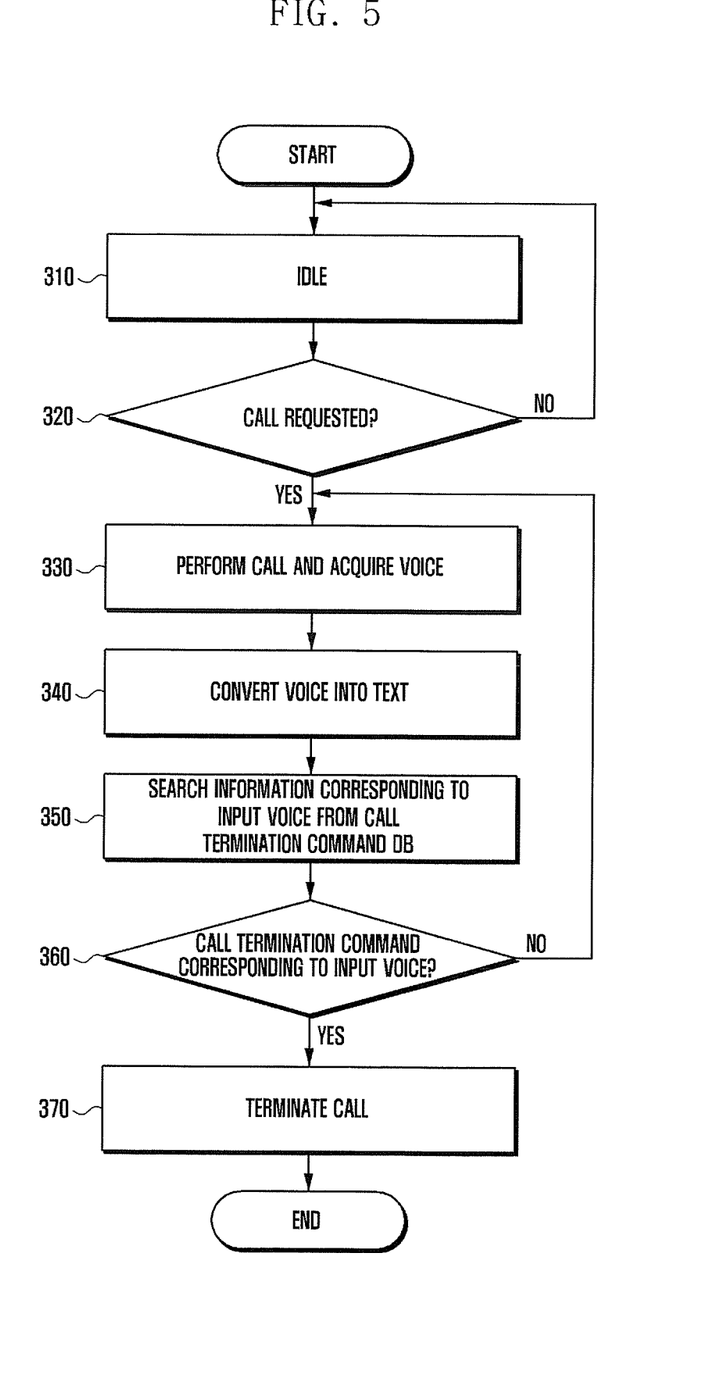
FIG. 5 is a flowchart illustrating a method for managing a call function of a terminal according to another embodiment of the present disclosure.

FIG. 5 is a flowchart illustrating a method of controlling a call function of a terminal according to one embodiment of the present disclosure.

Referring to FIG. 5, a controller 140 operates in an idle state (310). The controller 140 can control the display unit 160 to display a background screen, an idle screen, a power saving mode screen, and UI or GUI corresponding thereto.

Next, the controller 140 determines whether the call is requested (320). The controller 140 determines whether the call is automatically requested according to a user input for driving an application, a program, and a service for the call according to the need. Request for the call can be generated by a call transmission request of the user or a reception of call request. The terminal 100 can receive information about a call receiver or a call transmitter together with the call request.

If the call is requested, the controller 140 conducts the call and the voice input unit 120 acquires at least part of voice (330).

The controller 140 makes an outbound call by a call number corresponding to a call request or receives an incoming phone call. In this case, the controller 140 can display UI or GUI associated with conducting, the call. For example, the controller 140 can control the display unit 160 to display a number of the other party conducting the call, a call time or an image of the other party conducting the call.

The voice input unit 120 acquires voice that is inputted while conducting the call. The voice input unit 120 acquires and converts an analog signal corresponding to an input voice into a digital signal, and changes the digital signal into data which can be stored in the memory 150. In this case, a procedure of acquiring a voice by the voice input unit 120 can be the same as a procedure of acquiring a voice applied to voice recording, voice recognition, and a recording function during the call.

After that, the controller 140 can convert the voice into a text (340). The controller 140 can convert a voice inputted while performing the call into the text.

In detail, the controller 140 can extract a voice pattern from the voice. The controller 140 can search for a text corresponding to the extracted voice pattern based on a voice recognition dictionary including at least one text for voice recognition. As a result of the search, if there is a text corresponding to the extracted voice pattern, the controller 140 can convert the extracted voice into a corresponding text. Alternatively, if there is no text corresponding to the extracted voice pattern, the controller 140 can output a text, an image, an icon, and a sound indicating a voice recognition error.

Next, the controller 140 searches information corresponding to the input voice from the call termination command DB (350).

The controller 140 searches whether a call termination command corresponding to the input voice is included in the call termination command DB having at least one call termination command. The call termination command DB is the same as that configured according to the first embodiment of the present disclosure. The controller 140 can search the text converted from the voice from the call termination command DB. According to the implementation, the controller 140 does not convert the voice into a text, but can determine whether a corresponding analog signal exists in the call termination command DB as the acquired analog signal or a digital signal converted from an analog, signal. This can prevent an excessive load of work processing from being provided to the converter 140 converting the voice into the text.

After that, the controller 140 determines whether a call termination command corresponding to the input voice is included in a DB (360). The controller 140 determines whether the information corresponding to the input voice matches with data in DB under the call termination command according to the search result.

When the information corresponding, to the input voice matches with data in the DB under the call termination command, the controller 140 terminates the call (370).

If a part of voice inputted during the phone call corresponds to data stored in the DB under a call termination command stored in the call termination DB, the controller 140 determines that a user intends to terminate the call and terminate the call.

In the embodiment of the present disclosure, if the voice has not inputted for a preset time, the controller 140 can terminate the call. If the voice has not inputted for a preset time, the controller 140 can determine that the user intends to terminate the call and terminate the call. If the voice is not inputted, the controller 140 can determine whether to terminate the call and set a time for during the voice need not to be inputted from the user.

Figure 6:
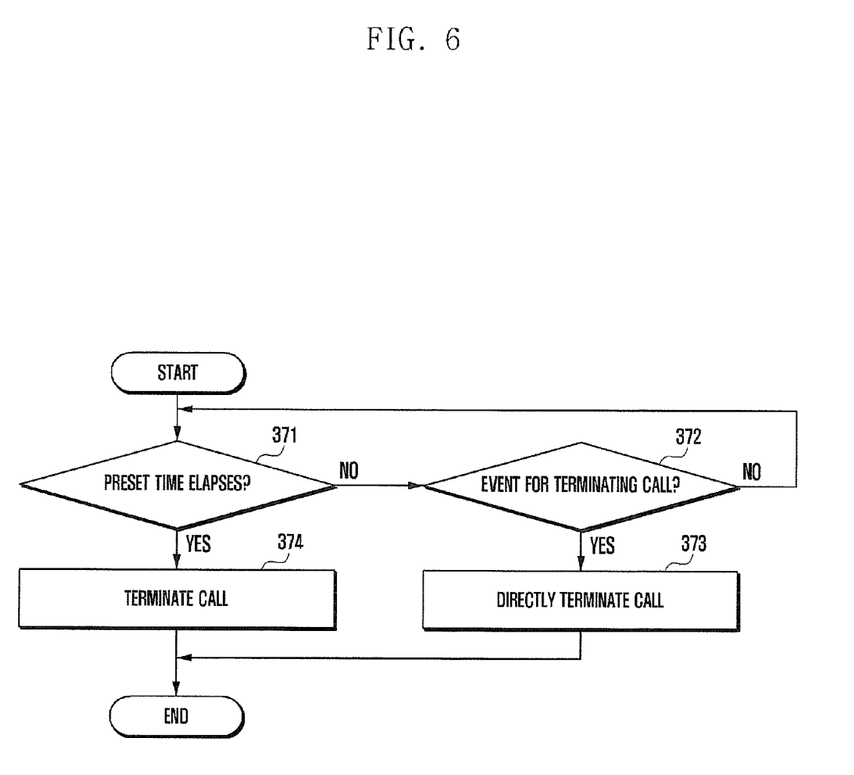
FIG. 6 is a flowchart illustrating a method for managing a call function of a terminal according to another embodiment of the present disclosure.

In one embodiment according to the third embodiment of the present disclosure, the controller 140 can terminate the call based on presence of event generation for terminating the call after a voice corresponding to the call termination command is inputted while performing the call.

In detail, referring to FIG. 6, the controller 140 determines whether a preset time elapses (371). The controller 140 determines whether the preset time elapses after a voice corresponding to the call termination command is inputted or the voice is not inputted for the preset time. The preset time can indicate a preset time to give a predetermined idle time unit the call is terminated after the user inputs the call termination command.

When the preset time does not elapse, the controller 140 determines whether an event for terminating the call occurs (372).

The call termination event can include at least one detection of specific illumination, specific motion, and touch or approach of an object. For example, the call termination event can be an event in which illumination around the terminal 100 is darkly detected by putting the terminal 100 in a dark place such as a pocket or a bag or covering a case of the terminal 100. The call termination event can be an event of detecting specific motion by putting the terminal on a flat surface or shaking the terminal 100.

The controller 140 can determine whether a call termination event occurs within a preset time using various sensors included in the terminal 100.

If the call termination event is detected, the controller 140 can directly terminate the call without waiting for a preset time (373).

When the voice corresponding to the call termination command is inputted and the call termination event occurs within the preset time, the controller 140 directly terminates the call without waiting until the preset time elapses.

If the call termination event is not detected within the preset time, the controller 140 repeatedly determines whether the preset time elapses.

When the preset time elapses, the controller 140 performs a call termination operation according to the call termination command (374).

Figure 7:
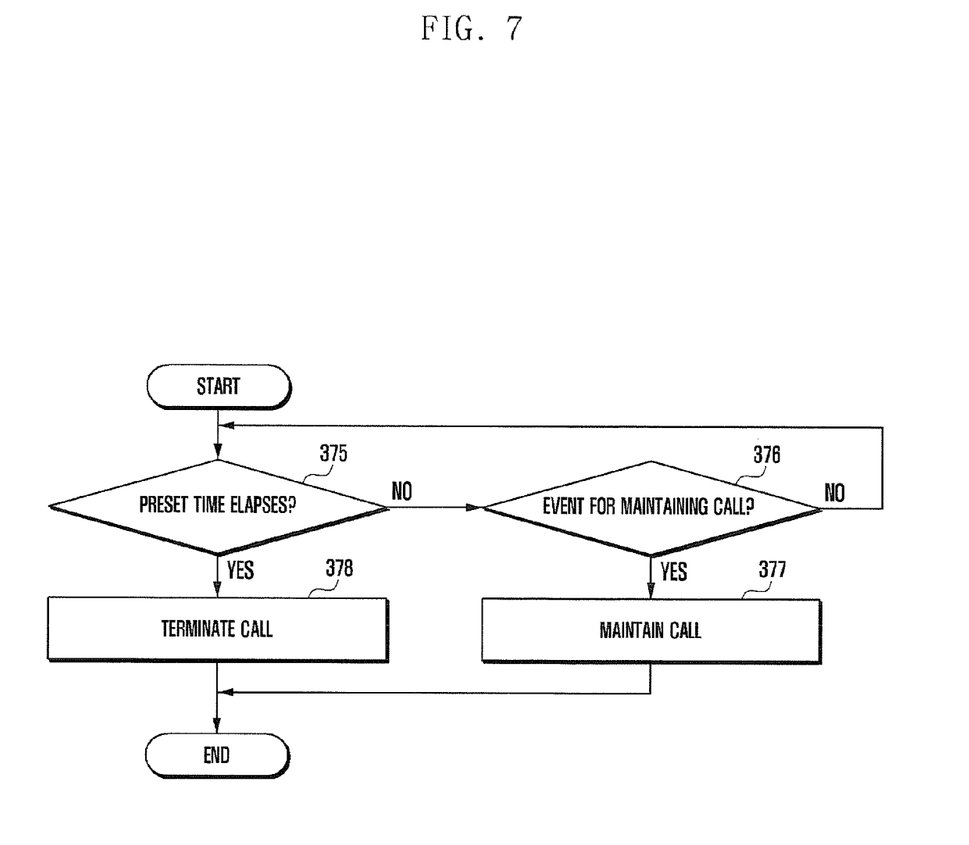
FIG. 7 is a flowchart illustrating a method for managing a call function of a terminal according to another embodiment of the present disclosure.

According to a fourth embodiment of the present disclosure, the controller 140 can terminate the call based on presence of generation of an event for terminating the call after the voice corresponding to the call termination command is inputted while performing the call.

In detail, referring to FIG. 7, the controller 140 determines whether the preset time elapses (375). The controller 140 determines whether the preset time elapses after it is detected that the voice corresponding to the call termination command is inputted or the voice is not inputted for the preset time. The preset time can indicate a preset time to give a predetermined idle time unit the call is terminated after the user inputs the call termination command.

When the preset time does not elapse, the controller 140 determines whether an event for maintaining the call occurs (376).

The controller 140 can determine whether a call maintenance event occurs within a preset time using various sensors included in the terminal 100. The call maintenance event can include a voice input event where a voice having the same voice pattern as the voice inputted when performing the call is continuously inputted. The controller 140 can acquire a voice inputted within the preset time and extract a voice pattern from the acquired sound to determine whether the sound input event occurs. The controller 140 can temporarily or permanently store the voice pattern with respect to the voice inputted during the call.

If the call maintenance event is detected, the controller 140 can continuously maintain the call (377). The controller 140 can determine presence of call termination based on a voice corresponding to the call termination command, a call termination event or a call maintenance event using a sensor. That is, although a voltage corresponding to the call termination command is inputted, if the call maintenance event occurs within the preset time, the controller 130 maintains the call.

Accordingly, the controller 140 can prevent termination of an involuntary call such as voice recognition error or voice recognition omission in a case of using only a voice or input of a call termination command not intending the call termination from stopping and increase precision of a call termination operation.

If the call maintenance event is not detected within the preset time, the controller 140 repeatedly determines whether the preset time elapses.

When the preset time elapses, the controller 140 performs a call termination operation according to the call termination command (378).

When the preset time elapses in a state that the call maintenance event is not detected, the controller 140 can maintain the call and repeatedly determine whether a voice inputted during the call corresponds to the call termination command.

The controller 140 can a latest call number in a latest call list as the call is terminated. The controller 140 can display a text, an image or output vibration or sound for informing that the call is terminated.

As the call is terminated, the controller 140 can enter an idle mode, a lock mode, or a power saving mode, display a screen associated with each mode, or change the screen to an off state.

As described above, according to the embodiment of the present disclosure, if a voice which the user generally uses is input during termination of the call or the voice is not inputted for a predetermined time, the controller 140 determines that the user terminates the call and terminates the call.

Accordingly, a when the user does not push termination button yet or cannot push the termination button even if the user intends to terminate the call, the call termination can be conveniently performed.

Figure 8:
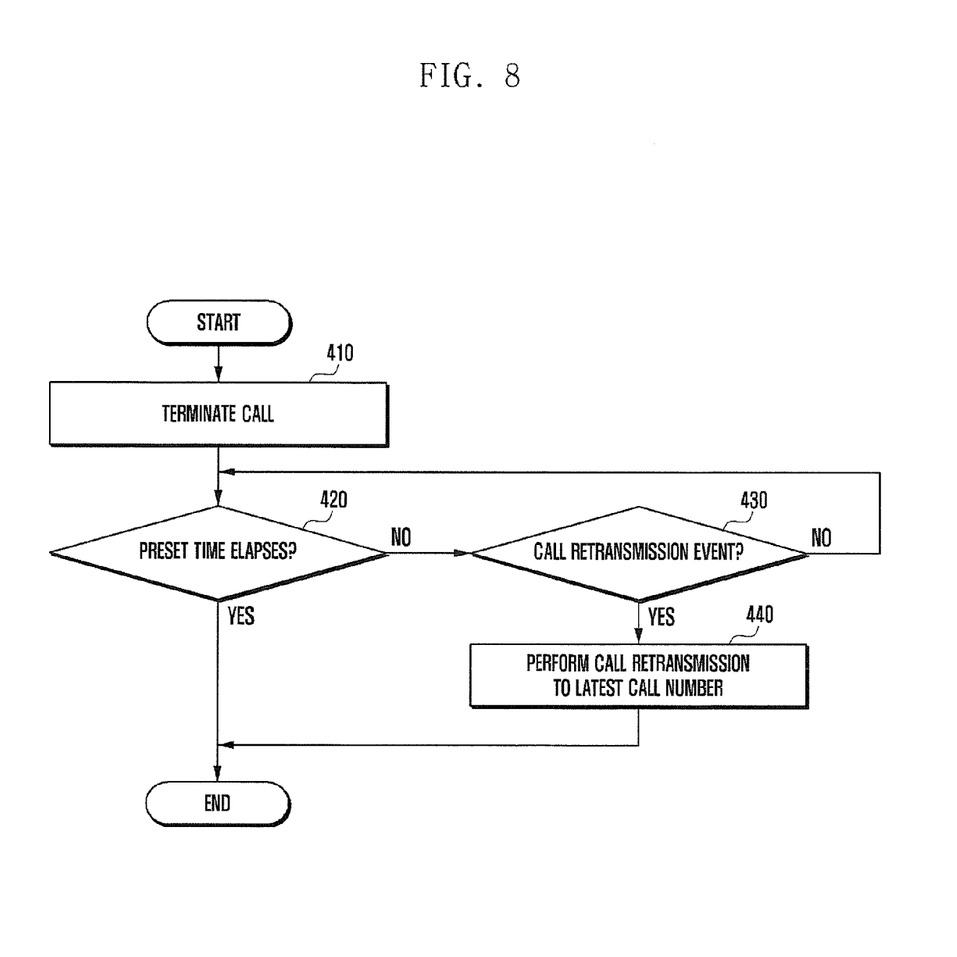
FIG. 8 is a flowchart illustrating a method for managing a call function of a terminal according to another embodiment of the present disclosure.

FIG. 8 is a flowchart illustrating a method of controlling a call function of a terminal according to one embodiment of the present disclosure. Referring to FIG. 8, a controller 140 terminates the call at 410.

By a call termination request, the controller 140 can terminate the call. The controller 140 determines whether the call termination is requested through menus, icons or buttons included in the terminal 100, a switch, or a jog dial for generating a call termination request. The controller 140 can terminate the call due to an involuntary situation. For example, when a call receiving signal is instable or signal strength becomes weak not to maintain the call, the controller 140 can terminate the call. For examples of involuntarily terminations, the terminal 100 can terminate the call due to instable network, or a problem on the terminal 100 because of call-off, limited signal, or no-service.

As the call is terminated, the controller 140 can store the latest call number in the latest call list. The controller 140 can display a text, an image or output vibration or sound for informing that the call has been terminated.

Next, after terminating the call, the controller 140 determines whether a preset time elapses (420). When the preset time does not elapse, the controller 140 determines whether a call retransmission event occurs (430).

The call retransmission event can be a voice request event where the voice requesting for the call retransmission is inputted. That is, the call retransmission event can include a voice input event which a voice having the same or similar voice pattern as that of a voice input during the phone call. For instance, the voice input event can occur when the call is involuntarily terminated and a user continues to speak, for example, without recognizing the termination. In this case, because the user speaks with the same or similar volume, speed and voice tone as during the phone call, the controller 140 receives the same or similar voice pattern as that inputted during the phone call. Accordingly, the controller 140 determines that the user intends to continuously conduct the call and makes a call retransmission.

To determine presence of the voice input event, the controller 140 can acquire a voice inputted within a preset time and extract a voice pattern from the acquired voice. The controller 140 can temporarily or permanently store a voice pattern of the voice inputted during the call.

The call retransmission event can include at least one detection of specific illumination, specific motion, and touch or approach of an object. For example, the call retransmission event can be an event of detecting a specific motion by shaking the terminal 100 by the user. The call retransmission event can be an event of detecting touch or approach of a human body by sticking the terminal 100 closely to an ear by the user.

The controller 140 can determine whether a call retransmission event occurs within a preset time using various sensors included in the terminal 100.

If the call retransmission event is detected, the controller 140 performs call retransmission to the latest call number (440).

The controller 140 can store and manage the latest call number according to transmission, reception, or termination of the call. If the call retransmission event is detected, the controller 140 acquires the stored latest call number. The controller 140 performs call retransmission based on the latest call number.

Accordingly, when the call is involuntarily terminated, the terminal 100 according to the present disclosure solves inconvenience to make a retransmission to the latest call number through a plurality of steps, and allows the user to conveniently perform call retransmission.

If the call termination event is not detected within a preset time, the controller 140 repeatedly determines whether the preset time elapses.

When the preset time elapses after the call is terminated, the controller 140 can enter an idle mode, a lock mode, or a power saving mode, and display the screen associated with each mode or turn off the screen.

The terminal and the method for controlling a call function according to the present disclosure grasps the intention of a user to terminate the call to disconnect a phone call after the end of conversation without a call termination key being pressed, so that the call is conveniently terminated and a unnecessary call maintenance is prevented.

In addition, the terminal and the method for controlling a call function according to the present disclosure grasps the user intent of automatically making a call retransmission to the final call number when the call is involuntarily terminated, so that inconvenience to go through a plurality of steps for the retransmission may be prevented.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing a call function of a terminal, the method comprising:
    sequentially acquiring at least one input voice based on a pause between input voices inputted while conducting a phone call, the pause being a preset period of time during which an input of voice is not detected;
    extracting the latest input voice among the at least one input voice sequentially acquired until a request for call termination is detected; and
    storing the extracted input voice as a termination command,
    wherein sequentially acquiring the at least one input voice comprises:
        processing, when the pause occurs after an input of voice is detected, the input voice;
        acquiring the processed input voice as a first input voice;
        processing, when a new pause occurs after input of a new voice, the new input voice; and
        acquiring the processed new input voice as a second input voice.

2. The method of claim 1, wherein sequentially acquiring the at least one input voice comprises temporarily storing the at least one input voice in a buffer with a predetermined capacity.

3. The method of claim 1, wherein storing the extracted input voice comprises:
    converting the extracted input voice into a text; and
    storing the converted text as the call termination command.

4. The method of claim 1, wherein storing the extracted input voice comprises:
    extracting a voice pattern of the extracted input voice;
    identifying a user based on the extracted voice pattern; and
    storing the extracted input voice as the termination command for the identified user.

5. The method of claim 1, further comprising:
    sequentially acquiring another at least one input voice while conducting another phone call;
    determining whether the acquired input voice corresponds to the termination command; and
    terminating the another phone call if the acquired input voice corresponds to the termination command, or a voice has not been inputted for a preset time.

6. The method of claim 5, wherein determining whether the acquired input voice corresponds to the termination command comprises:
    converting the acquired input voice into a text; and
    determining whether the converted text is identical to the termination command.

7. The method of claim 5, wherein terminating the another phone call comprises:
    determining whether the preset time elapses after the acquired input voice corresponding to the termination command was acquired;
    determining whether a call termination event occurs while the preset time does not elapse; and
    terminating the call when the call termination event occurs.

8. The method of claim 7, wherein the call termination event includes at least one of detection of specific illumination, specific motion, and touch or approach of an object.

9. The method of claim 5, further comprising;
    determining whether the preset time elapses after terminating the call;
    determining whether a call retransmission event occurs whether the preset time does not elapse; and
    performing call retransmission based on a call number of the another phone call when the call retransmission event occurs.

10. The method of claim 9, wherein the call retransmission event includes a voice input event of which the voice has a same voice pattern as that of the input voice during the another phone call.

11. The method of claim 9, wherein the call retransmission event includes at least one of detection of specific illumination, specific motion, and touch or approach of an object.

12. A terminal comprising:
    a voice input unit configured to receive a input voice;
    a memory configured to store at least one call termination command; and
    a controller configured to control to sequentially acquire at least one input voice based on a pause between input voices inputted while conducting a phone call, the pause being a preset period of time during which an input of voice is not detected, to extract the latest input voice among the at least one input voice sequentially acquired until a request for call termination is detected, and to store the extracted input voice as a termination command,
    wherein the controller is configured to:
        process, when the pause occurs after an input of voice is detected, the input voice, to acquire the processed input voice as a first input voice;
        process, when a new pause occurs after input of a new voice is detected, the new input voice; and
        acquire the processed new voice as a second input voice.

13. The terminal of claim 12, wherein the controller configured to convert the extracted input voice into a text and to store the converted text as the termination command.

14. The terminal of claim 12, wherein the controller configured to sequentially acquire another at least one input voice while conducting another phone call, determine whether the acquired input inputted corresponds to the termination command, and terminate the another phone call if the acquired input voice corresponds to the termination command or a voice has not been inputted for a preset time.

15. The terminal of claim 12, further comprising a sensor configured to detect a state of the terminal including at least one of illumination, motion, and presence of touch or approach of an object, and
    wherein the controller configured to determine whether a preset time elapses after the acquired input voice corresponding to the termination command was acquired, determine whether a call termination event occurs through the sensor while the preset time does not elapse, and terminate the call when the call termination event occurs.

16. A method of controlling a call function of a terminal, the method comprising:
    terminating a call;

determining whether a call retransmission event occurs before a preset time elapses after terminating the call; and conducting call retransmission based on a call number of the terminated call when the call retransmission event occurs, wherein determining whether the call retransmission event occurs comprises:
- acquiring a voice inputted within the preset time;
- extracting a voice pattern from the acquired input voice;
- determining whether the voice pattern matches a voice pattern extracted from a voice inputted during the call; and
- determining that the call retransmission event occurs when the voice pattern matches the extracted voice pattern.

17. The method of claim 16, wherein the call retransmission event further includes at least one of detection of specific illumination, specific motion, and touch or approach of an object.

18. The method of claim 16, wherein conducting of the call retransmission comprises outputting a call retransmission alarm in at least one form of a pop-up window, an indicator, an icon, vibration, and a sound.

19. A terminal comprising:
- a voice input unit configured to acquire a voice;
- a sensor configured to detect at least one of illumination, motion, and presence of touch or approach of an object; and
- a controller configured to control to terminate a call,
  - store the latest call number in the latest call list as the call is terminated;
  - determine whether a preset time elapses after terminating the call;
  - determine whether a call retransmission event occurs when the preset time does not elapse;
  - conduct call retransmission based on the stored latest call number when the call retransmission event occurs through one of the voice input unit and the sensor,
- wherein the call retransmission event includes a voice input event in which a voice having the same voice pattern as that of a voice input during the call, or
- wherein the call retransmission event includes at least one detection of illumination, motion, and presence of touch or approach of an object.

* * * * *